July 5, 1966　　H. DOEBL ETAL　　3,259,374
PROCESS AND APPARATUS FOR THE CONTINUOUS TREATMENT
OF PLASTIC MATERIALS
Filed Feb. 6, 1963
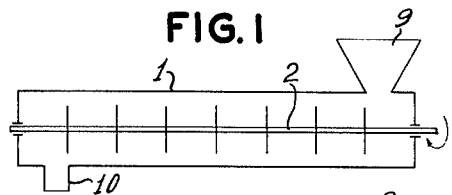
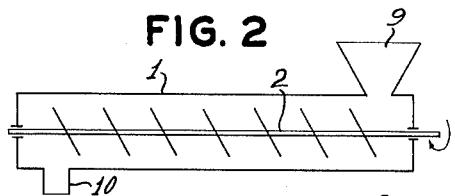
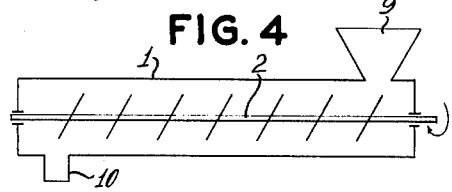
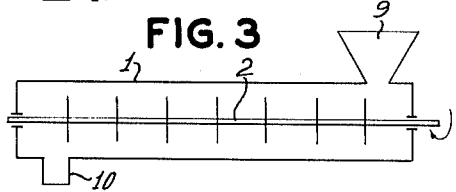
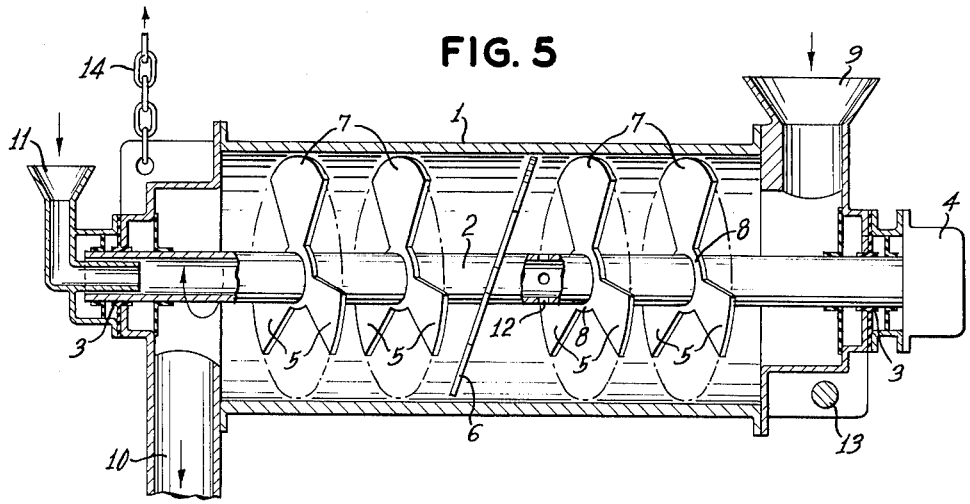
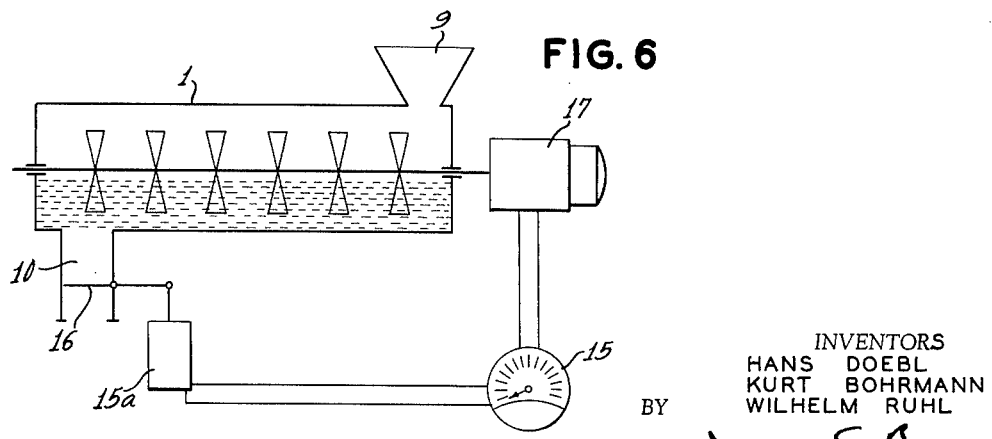
INVENTORS
HANS DOEBL
KURT BOHRMANN
WILHELM RUHL
BY
James E. Bryan
ATTORNEY

United States Patent Office 3,259,374
Patented July 5, 1966

3,259,374
PROCESS AND APPARATUS FOR THE CONTINU-
OUS TREATMENT OF PLASTIC MATERIALS
Hans Doebl, Kurt Bohrmann, and Wilhelm Ruhl, Kassel,
   Germany, assignors to Henschel-Werke A.G., Kassel,
   Germany, a corporation of Germany
Filed Feb. 6, 1963, Ser. No. 257,369
Claims priority, application Germany, Feb. 9, 1962,
   H 44,832
9 Claims. (Cl. 259—10)

This invention relates to a process and apparatus for the continuous treatment of plastic materials such, for example, as polyvinyl compounds, polyolefins, polyamides, polyesters and other synthetic materials, as well as natural materials of a plastic nature such as caoutchouc, for example.

For the treatment of such materials, machines such as kneaders, screw presses and the like have been used heretofore and, more recently, the treatment has been effected in high-speed mixing equipment. However, these latter high-speed machines can be operated only in a batchwise manner and in processes having a relatively short time cycle.

Heat is a necessity in the treatment of such plastic materials and high-speed mixing equipment, in which the high power requirements of the driving mechanism, such as high-powered electric motors for example, are converted into heat, is sufficient for the intended purpose. The heat is generated either by friction between the material being mixed and the container therefor or by friction between the material being mixed and the mixing elements of the equipment or by friction between the particles of the material being mixed, this latter method of generating heat being the most effective.

Most of the plastic materials treated in such processes are insulators and are, therefore, poor conductors of heat. Accordingly, high powered equipment is required in order to achieve economical heating periods. In actual practice, the heat of friction is complemented by external heating of the container for the material being mixed.

Despite the high-powered equipment employed and the use of additional exterior heating, the known processes for treating plastic materials are deficient since during the flow of material being treated, within the relatively short time cycle required, sufficient heat can not be imparted to the materials being mixed, or otherwise treated.

Furthermore, the extremely high speeds required in combination with the high power requirements result in excessive wear on the mixing elements of the equipment and on the container in which the mixing elements are mounted.

In the present invention, the heat balance during treatment of the plastic materials is improved and a sufficient amount of heat is guaranteed during the flow of the materials through the mixing or treating equipment. Also, excessive wear on the equipment is eliminated and a continuous treatment process for plastic materials is provided. In the process of the invention, the individual particles of the plastic material to be treated are reciprocated in a preferably horizontal tubular container or shell through which the material is passed. The reciprocating movement, i.e. to and fro, occurs within the space delimited by two swash plate type mixing elements. The reciprocating motion occurs about 50 times per second in an approximately axial direction, i.e. parallel to the axis of the tubular shell, and superimposed upon this motion is a synchronous, radial, motion whereby a varying acceleration is imparted to the individual particles of the material being mixed or otherwise treated.

Further, in the apparatus utilized to perform the process of the invention, an effective mixing element surface of at least about 360 square centimeters is preferably available in the mixing equipment for each 1,000 milliliters of material to be mixed or otherwise treated.

The addition of various additional components, if added, to the material to be treated or mixed preferably occurs within the first 20 percent of length of the treating zone, i.e., the cylindrical shell or container.

The temperature of the material to be treated or mixed may be controlled by the level of the charge in the tubular shell and, if it is desired to mix plastic materials while cool, the equipment may be exteriorly cooled and the axial as well as the radial motion of the particles of material being mixed or treated is simultaneously decreased by slowing the driving motor.

Different forms of mixing elements may be used in the present invention. Generally speaking, the apparatus includes a cylindrical container or shell having a rotatable shaft coaxially mounted therein on which a plurality of mixing elements are mounted at an inclined angle with respect to the shaft axis, the individual elements having a greater forwardly-conveying and lesser rearwardly-conveying effect.

An advantageous feature of the apparatus of the invention resides in the fact that the mixing elements are particularly easy to manufacture as they may be stamped out of a flat sheet of metal, for example.

The individual mixing elements include a plurality of substantially planar blades, for example each mixing element may include three blades, two of which are forwardly-conveying and one of which is rearwardly-conveying, although any other combination of number of blades and forwardly- and rearwardly-conveying blades may be employed so long as the net effect is a forwardly-conveying element. The tips of the blades lie on an elliptical curve and have close clearance with the cylindrical shell. The planes of the individual mixing elements may be parallel to each other or, if desired, the planes of the elements may have the same inclination with respect to the shaft axis but a different inclination with respect to each other. The individual mixing elements may, if desired, be formed in such a manner that the blades of an individual element are integral with a supporting hub.

It is also possible to vary the flow rate of the material through the equipment, and the residence time of the material to be mixed or otherwise treated, by controlling the speed of rotation of the shaft and also by varying the angle of inclination, with the horizontal, of the cylindrical shell, so that the force of gravity enhances or retards the conveying effect.

It is known that the consistency of such plastic materials changes during the mixing operation due to temperature fluctuations resulting from the treating process and the action of the equipment on the material to be treated must be regulated as a function of the change in the consistency of the material. A structurally simple regulation of the consistency of the material mixed or treated, which is particularly suitable for the continuously operating equipment of the present invention, is obtained by the use of a discharge means having a variable discharge aperture, such as a simple flap valve for example, the aperture of which is controlled as a function of the power requirements of the driving motor and as a result of which the quantity of charge in the equipment is automatically regulated. As a result of the automatic control, the driving motor for the mixing elements operates at a constant speed and, if the consistency of the material being treated remains constant, the current requirements for the electric motor do not change. If, on the other hand, the current requirements are increased, due to a change in the consistency of the material being treated, then the discharge aperture, which is connected to the motor by means of an automatic regulator, will open to a greater extent. If, on the other hand, the power requirements decrease below a predetermined value, the discharge aperture is decreased by the same automatic control and, thus, the amount of charge and also the current requirements for the driving motor will increase without resulting in any change in the speed of the driving motor itself.

This regulation is possible because the intensity of mixing and the frictional heat generated increase together with an increasing quantity of charge in the equipment during the continuous mixing operation, as a result of which changes in consistency of the mix will occur.

In order to provide a constant control for the discharge aperture, i.e., flap valve, for example, different transmission means may be utilized for the actuation thereof. Such means may operate mechanically, magnetically or pneumatically, for example. A hydraulically operated or electro-hydraulically operated transmission system connecting the motor and the regulator to the discharge valve has been found to be particularly advantageous because of trouble-free operation.

The invention will be further illustrated by reference to the accompanying drawings in which:

FIGURES 1 through 4 represent a schematic cross-section of one embodiment of the equipment of the present invention, showing the position of the mixing elements in the four quadrants during one complete revolution of the supporting shaft. Only that half of the mixing element positioned in the image plane is shown.

FIGURE 5 is a more detailed view, partially in section, of an apparatus for performing the process of the present invention, and FIGURE 6 is a schematic diagram in section showing the automatic control for the discharge valve whereby the consistency of the material to be mixed is maintained uniform.

The apparatus generally consists of a preferably horizontal tubular shell 1 having a coaxially mounted rotatable shaft 2 therein. A series of swash plates are arranged on the shaft 2 as mixing elements and, thus, upon rotation of the shaft, a reciprocating movement is synchronously superimposed on the rotational movement of the material to be mixed and which is subjected to the action of the swash plates. Also, if desired, striking elements, not shown, which may be adjusted from the exterior of the apparatus are also provided for influencing the flow path of the material to be treated.

Referring specifically to FIGURES 1 through 4, in FIGURE 1, the surfaces of the mixing elements are shown in the neutral position. In FIGURE 2, the shaft 2, together with the mixing elements, is shown rotated approximately 90°. In this position, the surfaces of the mixing elements produce an axial conveying effect toward the feed funnel 9. In FIGURE 3, the shaft and mixing elements are shown after a further rotation of about 90°, and the surfaces of the mixing elements have assumed a position having no axial conveying effect. In FIGURE 4, the shaft and mixing elements are shown rotated a further 90° and, thus, a complete revolution has been made. The conveying direction is toward the discharge outlet 10 due to the position of the surfaces of the mixing elements. Thus, during revolution of the shaft, a neutral position of the mixing elements, a position with a definite conveying action, a neutral position, and a position with a definite conveying action, will follow in succession.

The flow of material from the feed funnel 9 to the discharge 10 is effected by contact of the materials to be mixed with the mixing elements and/or by inclination of the entire apparatus.

The mixing and heating operation according to the process of the invention occurs as follows: A particle of the material to be mixed, which is passed between a pair of rotating mixing elements, is rapidly reciprocated in an axial direction, i.e. parallel to the shaft axis. Under optimum conditions, the particle changes direction approximately 50 times per second and, due to the design of the mixing elements or swash plates, the force to which the particle is subjected varies, depending upon the position of the particle relative to the swash plates. This results in an irregular displacement of the particles with respect to each other and, thus, an intense mutual friction between the particles occurs as well as intense mixing action. The friction and the mixing action is intensified by pressure resulting from the centrifugal motion of the particles. The labile system is forced to flow by contact with the mixing elements.

Tests have demonstrated that the friction and the mixing process occur within rather clearly defined portions of the mixing zone. This was shown by the addition of pigment at brief time intervals. As the material was discharged from the mixing equipment, it was observed that the colored pigment added to the material passed through the equipment without significant diffusion through the material treated. Furthermore, the color of the material discharged was considerably more intense than that obtained in conventional mixing processes and a 30 percent reduction in dyestuff could be achieved while obtaining the same degree of color as that obtained in high-speed mixing equipment heretofore known.

Furthermore, the heat balance of the present process is more favorable than those heretofore known. Also, a quantity of treated material which formerly required a power consumption of 40 kilowatts in a conventional mixer requires only 21 kilowatts in the present process. The peripheral speed of the mixing blades is also reduced from the conventional 40 to 60 meters per second to 7 to 9 meters per second in the apparatus of the present invention, with the result that wear on the equipment is decreased and undesirable discoloration of the product no longer occurs to any noticeable extent. Also, due to the lower peripheral speed of the blades, the undesired content of fines in the product is reduced.

Referring specifically to FIGURE 5, the shaft 2, driven by the motor 4, rotates in the bearings 3 and has mixing elements, including blades 5 and 7, secured to the shaft by welding or by screws, clamps, or bayonet-type locking type devices. The mixing elements are in planes which are inclined with respect to the shaft axis.

The flow of the material to be treated takes place from right to left in the embodiment of FIGURE 5, the shaft 2 rotating in the direction shown by the arrow. Three blades, designated 5 and 7, are provided on each mixing element, two of which, i.e., blades 5, act in a forwardly-conveying direction while blade 7 acts in a rearwardly-conveying direction.

Due to the resulting back and forth movement imparted to the material, an excellent mixing effect is obtained. The reference numeral 6 designates a mixing element rotated about 90° with respect to the other elements. The blades 5 and 7, which may be punched out of an elliptical sheet shown in phantom, may be attached to the shaft 2 by welding, for example. In this case, an annular connecting hub 8 is provided as a mounting for the individual blades.

The material is introduced into the cylindrical shell 1 through the feed funnel 9 and is discharged through the discharge pipe 10.

If desired, additional components may be introduced during the mixing process by feeding them through the inlet funnel 11 after which they pass through the hollow shaft 2 and are discharged through one or more openings 12 in the shaft by centrifugal force.

The apparatus may be pivotally mounted on a rod 13 and inclination of the apparatus with respect to the horizontal may be adjusted by the chain 14.

In FIGURE 6, there is schematically shown a shell 1 which is supplied with a charge to be treated through the feed funnel 9. A conventional flap valve 16 is mounted in the discharge opening 10, the flap valve being adjustable as a function of the power requirements of the driving motor 17. An indicating instrument 15 coacts with the regulator 15a, the latter serving to regulate the opening and closing of the flap valve 16 through a conventional transmission system.

If the quantity of charge increases during operation of the equipment, the power requirements of the motor 17 are increased and the automatcially controlled valve 16 is opened. If, on the other hand, the quantity of charge decreases, the current requirements of the motor are reduced and the valve 16 closes the discharge opening.

It will be obvious to those skilled in the art that many modifications may be made within the scope of the present invention without departing from the spirit thereof, and the invention includes all such modifications.

What is claimed is:

1. An apparatus for the treatment of plastic material comprising a cylindrical shell having feed and discharge means attached thereto, a rotatable shaft coaxially mounted in the shell and having power means connected thereto, and a plurality of mixing elements mounted on the shaft at an inclined angle with respect to the shaft axis, the individual mixing elements having greater forwardly-conveying and lesser rearwardly-conveying means thereon.

2. An apparatus according to claim 1 in which the individual mixing elements comprise a plurality of substantially planar blades.

3. An apparatus according to claim 2 in which the planes of the individual mixing elements are parallel.

4. An apparatus according to claim 2 in which the planes of the individual mixing elements have the same angle of inclination with respect to the shaft axis but are not parallel.

5. An apparatus according to claim 2 in which the blades are made integral with a supporting hub.

6. An apparatus according to claim 2 in which the tips of the blades lie on an elliptical curve and have close clearance with the cylindrical shell.

7. An apparatus according to claim 1 in which the individual mixing elements comprise three blades, two being forwardly-conveying and one being rearwardly-conveying.

8. An apparatus according to claim 1 in which the discharge means includes a variable discharge aperture which is automatically controlled as a function of the power requirements of the power means.

9. An apparatus according to claim 1 in which an effective mixing element surface of a least one 360 square centimeters is provided for each 1,000 milliliters of material to be treated.

References Cited by the Examiner

UNITED STATES PATENTS

| | | | |
|---|---|---|---|
| 1,077,145 | 10/1913 | Lawson | 259—109 |
| 1,880,021 | 9/1932 | McCauley et al. | 259—109 |
| 1,941,808 | 1/1934 | Connaughay | 259—9 |
| 2,620,173 | 12/1952 | White | 259—9 X |
| 2,652,594 | 9/1953 | Campbell | 18—47.3 |
| 2,750,163 | 6/1956 | Loedidge et al. | 259—109 |
| 2,904,401 | 9/1959 | Booth | 259—10 X |
| 2,955,319 | 10/1960 | Bauer | 18—2 |
| 2,994,914 | 8/1961 | Barta | 18—2 |
| 3,019,895 | 2/1962 | Loevenstein et al. | 259—9 X |
| 3,042,970 | 7/1962 | Terenzi | 18—47.3 |

FOREIGN PATENTS 424,905    1933    Great Britain.

WILLIAM J. STEPHENSON, *Primary Examiner.*

MORRIS LIEBMAN, MICHAEL V. BRINDISI,
*Examiners.*

C. B. HAMBURG, L. S. SQUIRES, *Assistant Examiners.*